June 2, 1953  H. C. CLAUSER ET AL  2,640,771
PROCESS OF PRODUCING FUSEE COMPOSITIONS
Filed Oct. 12, 1949
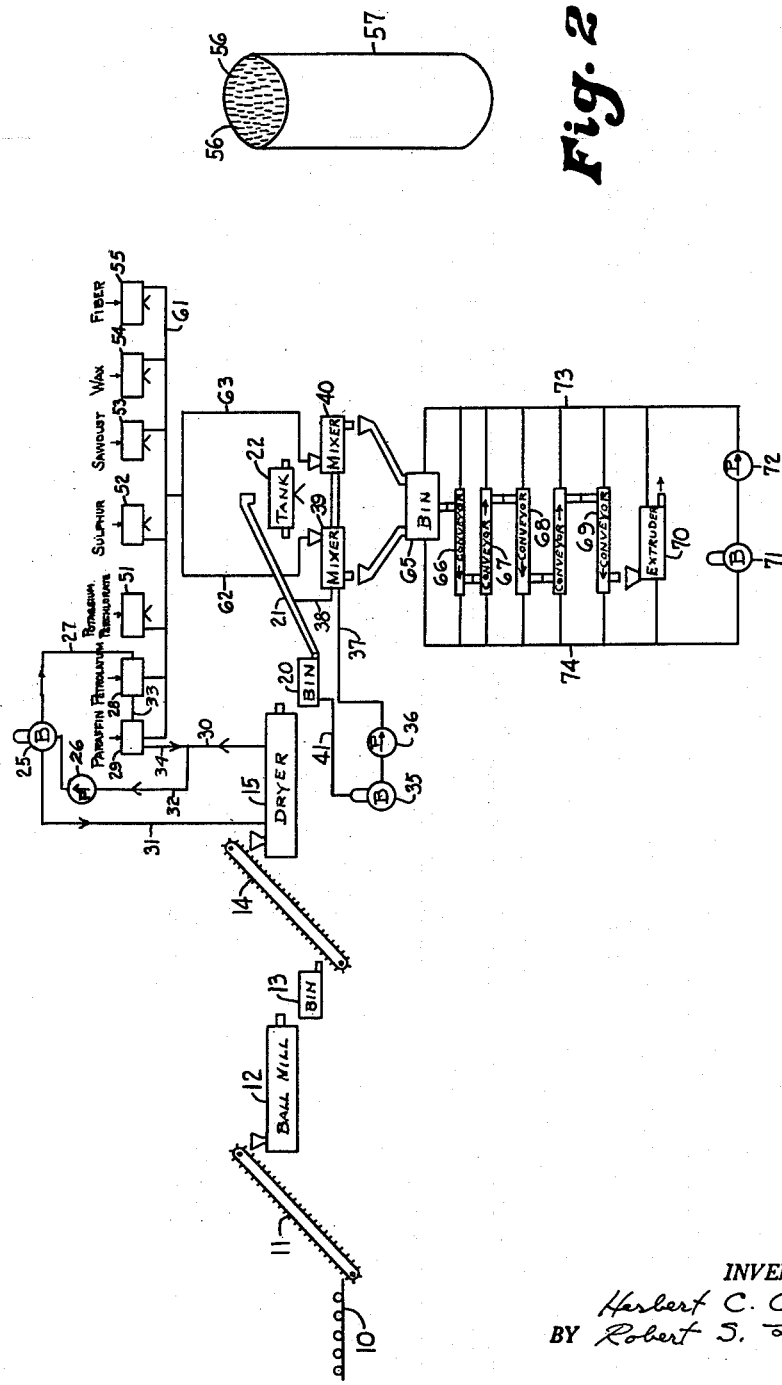
INVENTORS
Herbert C. Clauser
BY Robert S. Long
Schmieding, Hittson and Gerber
Attorneys Patented June 2, 1953

2,640,771

UNITED STATES PATENT OFFICE 2,640,771

PROCESS OF PRODUCING FUSEE COMPOSITIONS

Herbert C. Clauser and Robert S. Long, Westerville, Ohio, assignors, by mesne assignments, to Kilgore Inc., Westerville, Ohio, a corporation of Ohio Application October 12, 1949, Serial No. 121,026

2 Claims. (Cl. 52—23)

This invention relates to pyrotechnic devices. In general, the invention is directed to a signal fusee or flare, such as used in connection with railroads and the like, and to a process for manufacturing the fusee.

It has been found that an improved fusee can be produced by a process in which the fusee composition is converted to a plastic state such that it can be extruded in columnar form. A fusee formed in this manner is more compact and possesses a self-supporting columnar body having a longer burning time per unit of columnar length than is obtained with fusees constructed in accordance with the present standard practice. The extruded fusee also burns more uniformly, produces a better candle power and color characteristics, and is more moisture resistant than fusees made by tamping loose, bulk composition material into a paper tube or wrapper as presently done. Furthermore, a fusee body formed by this extrusion process is stronger and adapted for machine processing to complete the finishing operations, such as inserting the prime composition and applying the outside wrapper which weatherproofs the fusee and indicates its burning color.

One of the objects of this invention is to provide a fusee body of the character described. Another object of the invention is to provide a process for producing the fusee body. In accomplishing these objects, the invention includes forming a fusee body from ingredients which can be extruded in columnar form, and which when solidified produce a strong columnar body having a high melting point. It is also an object to provide fusee bodies formed in this manner with anchoring means for the softened material of the column, whereby the body retains its shape while burning. Fusees made in this manner are more compact and provide a shorter columnar length for a given burning time. Furthermore, fusees so made can be produced in greater quantities and with less time and skill, all of which provides for savings in manufacturing, storage and handling costs.

It is also an object of this invention to provide a process by which fusee composition can be converted to a plastic state for extrusion purposes. In accomplishing this object, it is also an object to provide for extruding the fusee composition as a continuous column. The process also includes the step of heating only the major ingredient or component of the fusee composition to the highest temperature required. This step in the process provides for reducing the bulk of material handled and the cost of heating. Additionally, the process includes the step of mixing the major component with the remaining components of the fusee composition at a reduced temperature, and then working the mixed mass until it attains a plastic condition having a dough-like consistency.

Further objects and advantages of the present invention will be apparent from the following description, reference being had to the accompanying drawing, wherein a preferred form of embodiment of the invention is clearly shown.

In the drawings:

Fig. 1 is a diagrammatic sketch in the nature of a flow sheet showing various steps in the process; and Fig. 2 is a perspective view of a fusee body in extruded form which shows the position and alignment of the fibers used to anchor the composition in place.

Referring further to Fig. 1, as an example, a satisfactory fusee composition may comprise substantially the following ingredients by weight:

| | Per cent |
|---|---|
| Strontium nitrate | 70.92 |
| Potassium perchlorate | 9.46 |
| Sawdust | 2.36 |
| Sulphur | 8.94 |
| Paraffin | 4.73 |
| Carnauba wax | 2.10 |
| Petrolatum | 1.03 |
| Hemp fibers | 0.46 |

In the preferred process, the strontium nitrate in bulk form is handled on barrel skids and the handling equipment indicated generally at 10. A bucket elevator or conveyor 11 carries the strontium nitrate to the ball mill 12. This mill may be of the type known as a Patterson tube mill. The strontium nitrate is reduced to pulverant form in this mill and discharged into the storage bin 13. A second bucket elevator or conveyor 14 carries the strontium nitrate from the bin 13 to the dryer 15. This dryer may be of the type known as a Louisville dryer and is maintained at a temperature in the range of 180° F. to 200° F. The strontium nitrate, being somewhat hygroscopic, is dried to remove the moisture. The heat supplied to the dryer 15, in addition to removing the moisture, provides for raising the temperature of the strontium nitrate to within the range of 180° F. to 200° F.

As shown in the drawings, means are provided for heating the dryer 15 and tanks 28 and 29 with steam. In the preferred form, the heating means comprises a steam boiler 25 and condensate pump 26. Steam flows from boiler 25 through pipe 31, in the direction of the arrow, to the dryer 15. The condensate from the dryer 15 is returned by pump 26 through the pipes 30 and 32 to the boiler 25. Steam flows from the boiler 25 through pipe 27, in the direction of the arrow, to the jackets of tanks 28 and 29. Condensate from tanks 28 and 29 returns through the pipes 33 and 34 to pipe 32 and back to the boiler as shown. A hot water heating system is provided for heating the bin 20 and the closed conveyor 21. The heater 35 and circulating pump 36 are provided for this purpose. Water is circulated from the heater 35 and pump 36 through the pipe 37 to the water jackets surrounding the mixers 39 and 40. From these mixers the return is through pipe 38 to the water jacket enclosing the closed conveyor 21, then through the water jacket surrounding the bin 20, and via pipe 41 to the heater 35. This heating system is adapted to maintain the bin 20 and conveyor 21 at a temperature in the range of 180° F. to 200° F. It will be apparent, however, that if desired, a single heating system can be used for the dryer 15, tanks 28 and 29, bin 20, conveyor 21, and the mixers 39 and 40.

The strontium nitrate, after being dried and heated, is discharged from the dryer 15 to the storage bin 20. The closed, screw type conveyor 21 carries the strontium nitrate from the bin 20 to the weigh tank 22. This tank is of the type adapted to weigh a charge and alternatively discharge the charge first to one receiver and then to another receiver. Here, for example, tank 22 discharges first to the mixer 39, and then a charge to the mixer 40. As previously described, the heating systems indicated at 35 and 36 provide for maintaining the mixers 39 and 40 in a heated condition. It is preferred that the temperature of the heaters be maintained in the range of about 150° F. to 170° F. In operation, the heated strontium nitrate is discharged into the weigh tank 22 and weighed to provide a charge of approximately 400 lbs. where the extruded column is to be approximately ⅞ inch in diameter and extruded at a rate of approximately 100 ft. per minute.

The remaining components of the fusee composition are contained within the tanks indicated at 28, 29, 51, 52, 53, 54 and 55. As previously described, the tanks 28 and 29 are jacketed and heated by the heating systems indicated at 25 and 26. In the preferred form, the tanks 28 and 29 are maintained at a temperature in the range of 150° F. to 170° F. These tanks contain the paraffin and the petrolatum which are maintained in a melted condition by a temperature in this range. The remaining componets, i. e., potassium perchlorate, sulphur, sawdust, carnauba wax and hemp fiber, are contained within the tanks 51 to 55, inclusive, which are also provided with the necessary screens and scales for preparing the charges in the proper amount. The hemp fibers, indicated at 56 in Fig. 2, are approximately ½ to ¾ of an inch in length and comprise about ½ of 1% by weight of the entire charge. If preferred, a stiff vegetable fiber or cattle hair can be used in place of hemp fibers. The fibers 56 form an anchoring means or binding agent which strengthens the columnar body by anchoring in place the materials softened when the body burns. As shown, all of the tanks 28, 29 and 51 to 55, inclusive, discharge into a common header, indicated at 61, which in turn discharges alternatingly through either the conduit 62 or the conduit 63 into one of the mixers 39 or 40.

The mixers 39 and 40, which are of the ribbon type, receive the strontium nitrate charge heated to a temperature of approximately 190° F., the paraffin and petrolatum charges at a temperature of approximately 160° F., and the remaining components at approximately room temperature. These latter components, being at a lower temperature than the strontium nitrate, paraffin or petrolatum charges, reduce the temperature of the strontium nitrate to approximately 160° F., in the mixers 39 and 40. After mixing the fusee composition for a period of approximately 10 minutes in the mixers 39 and 40, the mixed mass is discharged at a temperature of approximately 160° F. into the bin 65. From the bin 65 the mixed mass is fed into the first section 66 of a closed and jacketed conveyor. This conveyor is formed with sections connected in series, as indicated at 67, 68 and 69. The bin 65, conveyor sections 66 to 69, inclusive, and the extruder 70 are heated with water circulated through jackets connected to the heater 71 and circulating pump 72 through the conduits indicated at 73 and 74. From the last section 69, the mixed mass is discharged into the extruder 70. The helical cut flight conveyor sections 66, 67, 68 and 69 are maintained at a temperature in the range of 130° F. to 140° F. and provide further mixing for the fusee composition. When finally discharged from the extruder 70, the mixed mass has attained a plastic condition having a dough-like consistency. In the preferred operation, the cycle of operation from the mixers 39 and 40 to the discharge from the extruder 70 requires approximately 30 minutes.

In operation, it was found that the mixing of the components forming the fusee composition must be such that the paraffin, petrolatum and wax thoroughly coat all of the particles of the mass being mixed. This coating serves as a lubricant and facilitates extruding the mass in a plastic condition. It is also necessary to maintain the temperature of the mixture, at the point of extrusion, in a temperature range such that the composition will be extruded with a dough-like consistency. Thus, for example, if the temperature is maintained in a higher range than 130° F. to 140° F., for the example given, the mass extruded is in a more fluid or a more liquid condition not suitable for rapid solidification in columnar form as contemplated here.

From the above description, it will be apparent that the process described provides for economically and rapidly converting fusee composition to a plastic state suitable for extrusion. Furthermore, the heat of the major component handled, i. e., the strontium nitrate, which comprises approximately 70% of the composition, is utilized to heat other components of the composition. From the extruder 70, further processing of the extruded column 57 follows in accordance with the disclosure contained in the copending application of the assignee, Serial No. 121,025, filed October 12, 1949, now abandoned, for an extrusion process, and to which cross reference is made.

While the form of embodiment of the present invention as herein disclosed constitutes a preferred form, it is to be understood that other forms might be adopted, all coming within the scope of the claims which follow:

We claim:

1. A process for converting fusee composition to a plastic state for extrusion purposes which comprises the steps of reducing a metallic nitrate to a pulverant form; heating said metallic nitrate in pulverant form to a temperature maintained in the range of about 180° F. to 200° F.; mixing said metallic nitrate while heated with potassium perchlorate, sawdust, sulphur, paraffin, carnauba wax, petrolatum and hemp fibers; and then working the mixed mass of fusee composition at a temperature maintained in the range of about 130° F. to 140° F. until the mixed mass attains a plastic condition having a dough-like consistency.

2. A process for converting fusee composition to a plastic state for extrusion purposes which comprises the steps of reducing a metallic nitrate to a pulverant form; heating said metallic nitrate in pulverant form to a temperature maintained in the range of about 180° F. to 200° F.; mixing said metallic nitrate while heated with potassium perchlorate, sawdust, sulphur, paraffin, carnauba wax, petrolatum and hemp fibers at a temperature maintained in the range of about 150° F. to 170° F.; and then working the mixed mass of fusee composition at a temperature maintained in the range of about 130° F. to 140° F. until the mixed mass attains a plastic condition having a dough-like consistency.

HERBERT C. CLAUSER.
ROBERT S. LONG.

References Cited in the file of this patent

UNITED STATES PATENTS

| Number | Name | Date |
| --- | --- | --- |
| 399,878 | Graydon | Mar. 19, 1889 |
| 677,528 | Maxim | July 2, 1901 |
| 1,029,884 | Niditch | June 18, 1912 |
| 1,065,987 | Toccaceli | July 1, 1913 |
| 1,106,087 | Du Pont et al. | Aug. 4, 1914 |
| 1,908,979 | Herbst | May 16, 1933 |
| 2,113,004 | Snelling | Apr. 5, 1938 |
| 2,363,569 | Caldwell et al. | Nov. 28, 1944 |
| 2,484,355 | Parsons | Oct. 11, 1949 |
| 2,498,050 | Selvidge | Feb. 21, 1950 |